Nov. 19, 1940.  W. P. DILLON, JR., ET AL  2,222,364
WEIGHING MACHINE AND AMUSEMENT DEVICE
Filed Dec. 10, 1937  4 Sheets-Sheet 1
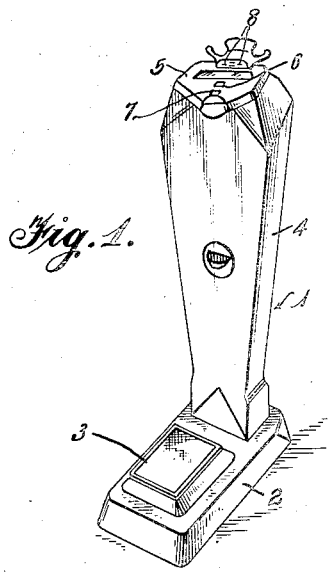
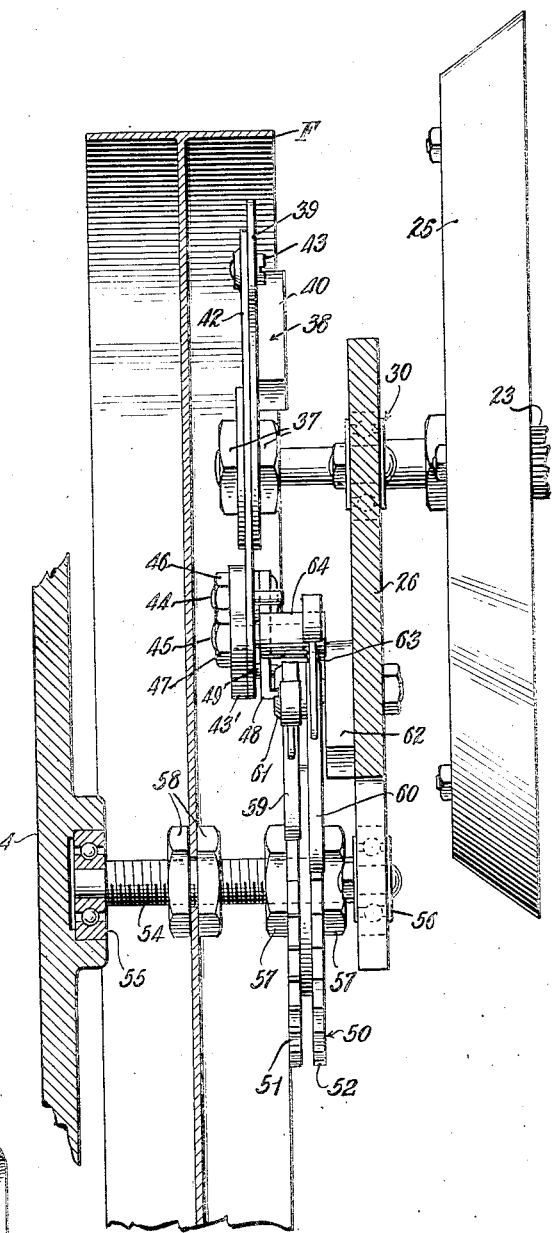
Inventors
William P. Dillon, Jr.
and Francis V. Allen
By Earle D. Hammond
Attorney

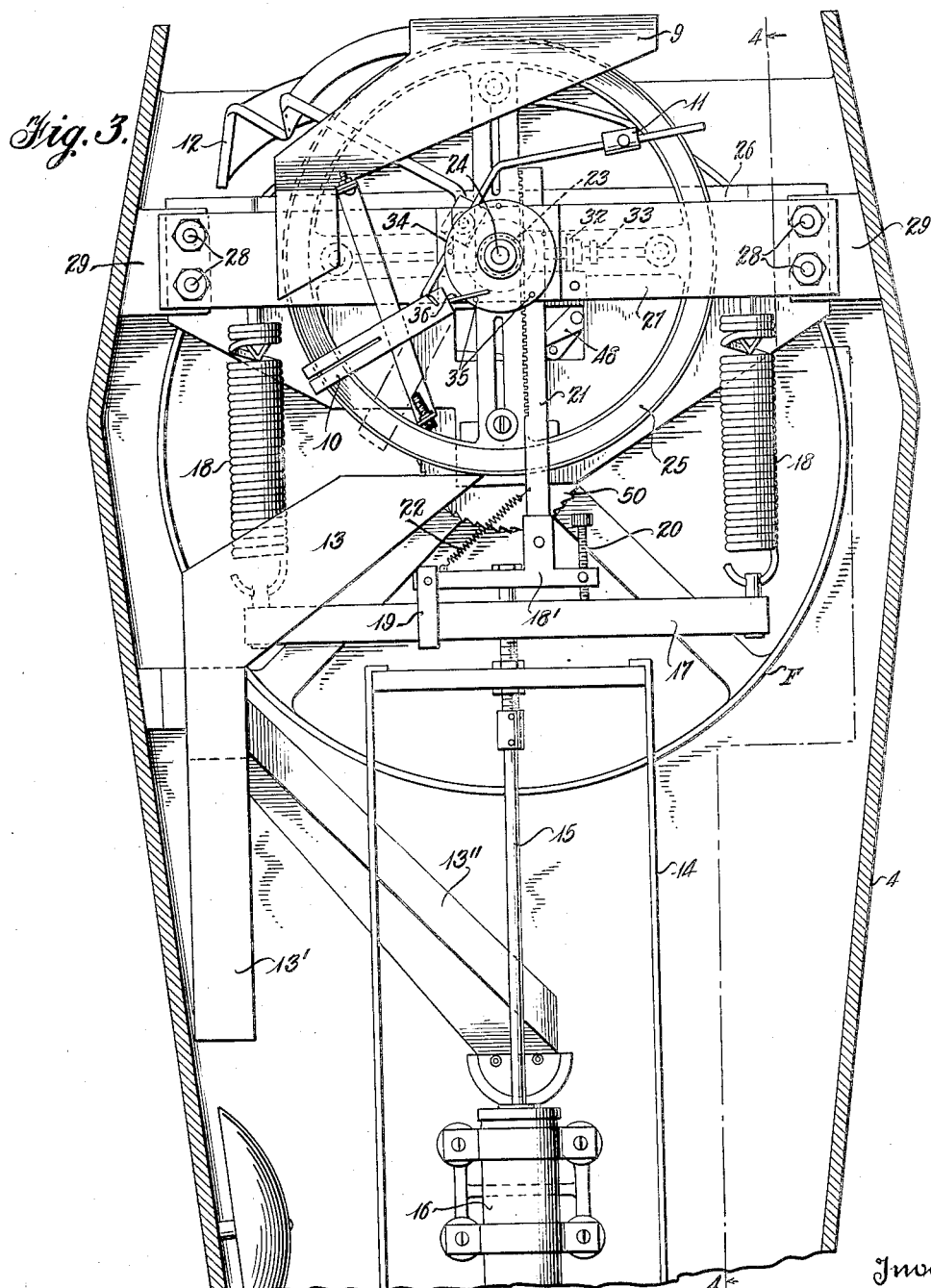

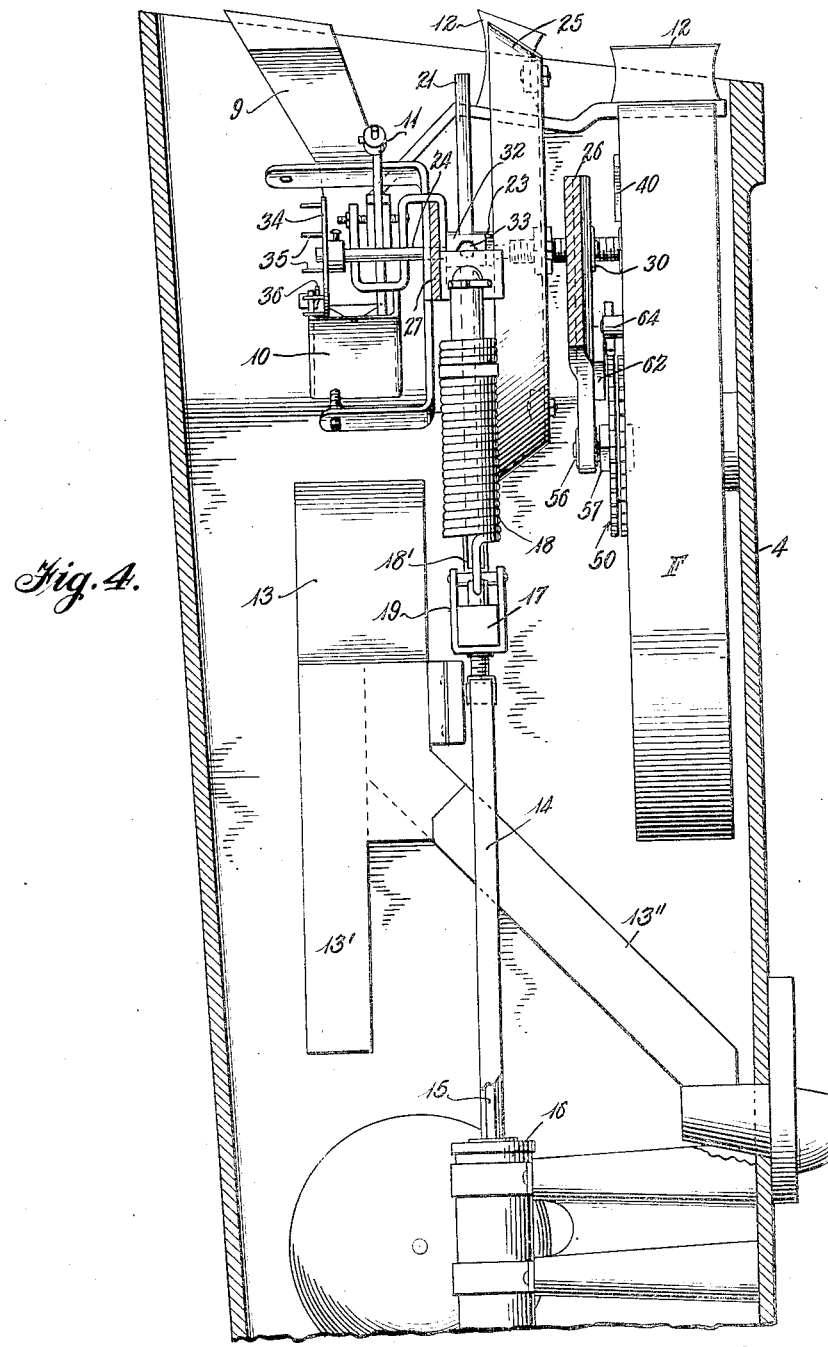

Nov. 19, 1940.  W. P. DILLON, JR., ET AL  2,222,364
WEIGHING MACHINE AND AMUSEMENT DEVICE
Filed Dec. 10, 1937  4 Sheets-Sheet 4

Inventors
William P. Dillon, Jr.
and Francis V. Allen

By Earle D. Grammond
Attorney

Patented Nov. 19, 1940

2,222,364

UNITED STATES PATENT OFFICE 2,222,364

WEIGHING MACHINE AND AMUSEMENT DEVICE

William P. Dillon, Jr., Washington, D. C., and Francis V. Allen, Cottage City, Md., assignors to American Scale Manufacturing Co., Washington, D. C., a corporation of Delaware Application December 10, 1937, Serial No. 179,194

5 Claims. (Cl. 273—161)

This invention relates to weighing machines and amusement devices, and more particularly to a coin controlled platform type weighing machine having combined therewith a fortune wheel operable by the weighing machine mechanism during an initial period of the weighing machine actuation.

It is one of the objects of the invention to provide an amusement device in the form of a fortune wheel visible through the head of a weighing machine and so associated with the weighing machine mechanism as to utilize for its actuating power the weight of a person on the scale platform.

Other objects of the invention are to provide a fortune wheel which is automatically actuated by and disconnected from the weighing scale mechanism during a small predetermined and low indicating range of the scale so that it will not interfere in any manner or exercise any influence on the weighing mechanism above a predetermined weight indication, to provide a changeable fortune indicator which is changed with each operation of the scale and is simultaneously displayed with the weight indicator of the scale by a coin controlled mechanism, and to provide a simple fortune wheel mechanism which does not require manual operation and which will not easily get out of order.

The invention comprises the combined fortune wheel changeable exhibitor and scale hereinafter more specially described, and further objects and advantages will be apparent from the following specification and by reference to the drawings forming a part thereof wherein like reference numerals indicate like parts throughout the several figures, and wherein—

Fig. 1 is a perspective view of the machine.

Fig. 2 is an enlarged plan view of the head cover of the machine in Fig. 1.

Fig. 3 is a rear elevation of the weighing and fortune wheel mechanism with the head casing shown in section.

Fig. 4 is a vertical section taken on the line 4—4 of Fig. 3.

Fig. 6 is a side elevation of the mechanism of Fig. 5 inclusive of the fortune wheel shown in section.

Figure 5:
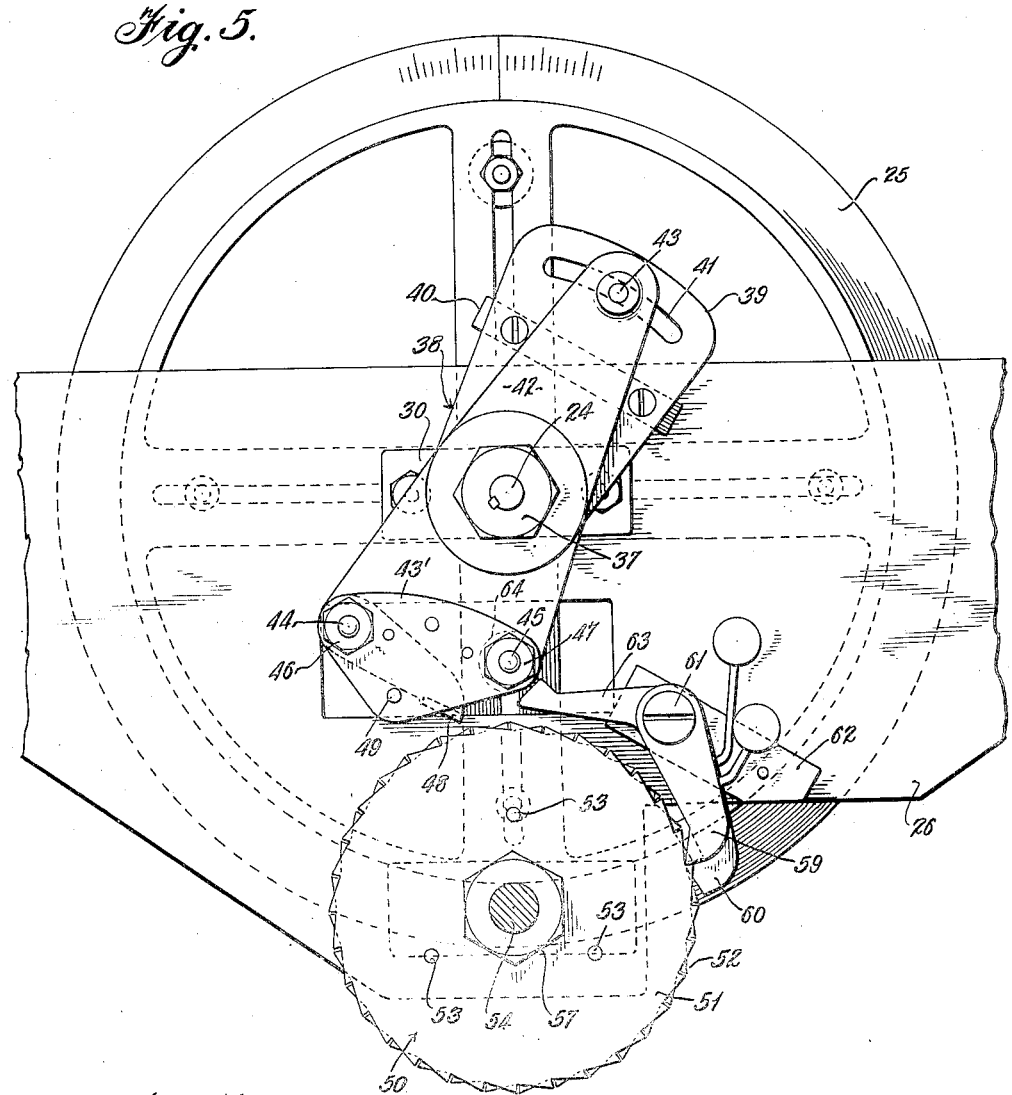
Fig. 5 is an enlarged detail view in front elevation of the fortune wheel actuating mechanism.
Figure 7:
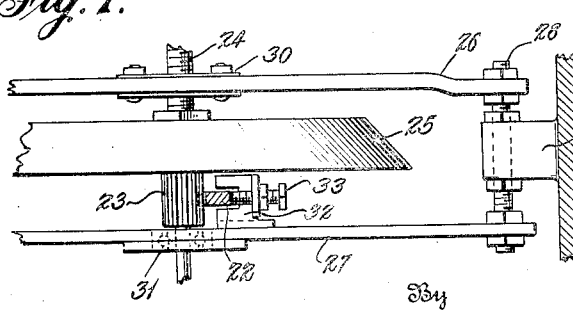
Fig. 7 is a fragmentary horizontal plan view illustrating the head supports and weight wheel mounting.

With reference to the drawings, I indicates a coin controlled weighing machine and fortune exhibitor in its entirety. The device comprises the conventional base 2, platform 3 and upright housing or head 4 for the weighing machine and fortune wheel mechanism. A head cover 5 detachably mounted on the upper end of housing 4 and serving as a cover for the machine has spaced windows 6 and 7 through which the weight indicating wheel and the fortune wheel may be viewed by a person standing on the weighing platform.

Coin slots 8 connect with a chute 9 to convey coins to a shutter operating mechanism of conventional form including coin cup 10, counterweight balance 11 and shutter 12. The weight of a coin falling into the coin cup serves to swing the shutter in the normal manner to uncover the fortune wheel and weight indicating dial windows. In the operation of the device, the coin is delivered from the cup to a second coin chute 13 which has two branches 13' and 13", the first serving to deliver coins into the machine and the second serving for delivery of some coins into a coin return cup at the front of the machine providing a free weight operation.

Connections of conventional form extend between the platform 3 and the weight indicating mechanism including a frame 14 having a cross head adjustably connected with rod 15 associated with dash pot 16 and connected at its upper end centrally through bar 17 supported at its ends by springs 18 and a zero adjustment bar 18' which is pivotally mounted at one end on link 19 and provided at its other end with a supporting adjustment screw 20 operable to swing the adjustment bar on its pivotal support to effect scale adjustments. A rack bar 21 is pivotally mounted on the adjustment bar 18' at one side of the rod connection and this rack bar is biased in one direction by spring 22 to hold the rack in engagement with a pinion 23 fixed to shaft 24 carrying weight indicating wheel 25.

The mechanism is supported in the head of the machine by transverse plates 26 and 27 which have their ends connected by threaded studs 28 to lugs 29 extending inwardly from opposite sides of the head. The shaft 24, extends through the transverse plates on each side being journaled in bearings 30 and 31 in the spaced plates and carries, fixed to the shaft between the plates, pinion 23 and balanced weight indicating wheel 25 provided on its angular periphery with a weight scale readable through the window in the cover. The rack bar 21 engaging the pinion passes freely through a channel guide 32 having an adjustment screw 33 to regulate the clearance for the bar within the guide and to prevent its disengagement from the pinion.

The extension of shaft 24 at the rear end has fixed thereto by a set screw or other fastening an escapement wheel 34 provided in its edge portion with a plurality of spaced pins 35 parallel to the shaft. The escapement is adjustable on the shaft to provide for engagement of the pins with an extension 36 on a movable member of the coin cup to trip the cup for delivery of the coin to chute 13. The shaft at its forward end carries an adjustable fortune wheel actuator 38 fixed to the shaft by the clamping nuts 37. The actuator comprises a plate 39 provided with a weight 40 and an arcuate slot 41 and a plate 42 provided at its upper end with an aperture in registry with the arcuate slot to receive a screw fastening 43 passing through both plates, whereby adjustment of the plates may be obtained by a relative swinging movement of one with respect to the other.

Plate 42 carries at its lower end a weight 43' on one face of the plate and spaced studs 44 and 45 extending from the other side of the plate. The studs are anchored to the plate assembly by nuts 46 and 47, respectively. A pawl member 48 is pivoted at its end on stud 44 and swings downwardly under its own weight against a stop pin 49 in position to engage teeth of a double ratchet wheel 50 to rotate the ratchet wheel when the shaft is rotated in a weighing operation. The ratchet wheel comprises two spaced ratchet discs 51 and 52, permanently fastened together in spaced relationship by rivets 53 or other suitable means with their ratchet teeth facing in opposite directions. The ratchet wheel 50 and a fortune wheel F are adjustably mounted in spaced relationship on an intermediate threaded portion of a shaft 54 parallel to the weighing mechanism shaft and rotatably supported in ball bearing 55 secured in the front wall of the head casing and ball bearing 56 supported in the lower portion of the transverse member 26. The ratchet wheel is fixed to the shaft by nuts 57 threaded on the shaft and rotatable into clamping engagement with the wheel. The fortune wheel is similarly fixed to the shaft by nuts 58. The ratchet wheel is normally held against rotation in one direction by weighted pawl 59 and in the opposite direction by weighted pawl 60, both of which are pivotally mounted on stud 61 on a boss 62 on the transverse support so that the pawls lie in the respective planes of the ratchet wheel. Pawl 60, which prevents clockwise rotation of the ratchet wheel, is provided with a lever extension 63 having an inclined nose portion which lies in the path of an antifriction roller 64 rotatably mounted on stud 45 and which serves to trip the lever pawl member to free the ratchet wheel for clockwise rotation when the weighing machine mechanism rotates in a counterclockwise direction as viewed in Fig. 5. The engagement of the roller with the nose of the pawl occurs in the initial movement of the plate actuating member just prior to the engagement of the driving pawl 48 with the companion ratchet wheel to actuate the fortune wheel. Adjustment of timing and engagement of the roller with the lever pawl and the driving pawl with the ratchet wheel is accomplished by relative movement of the plates 39 and 42 and the clamping of these plates in their position of adjustment by the bolt passing through the arcuate slot.

The fortune wheel or drum F carries on its outer surface or periphery a series of individual printed fortunes each of which occupies space on the drum of such size as to be viewed and readable through the window in the top of the machine. The individual fortunes also bear a definite relation to the toothed ratchet wheel so that the wheel is stopped in registry with the window.

The arrangement is such that the power for operation of the fortune wheel is derived from the weight of a person on the platform of the scale. Interengaging connection of the weighing mechanism with the fortune indicating means occurs only in the initial movement of the shaft carrying the weight indicator, or in other words only during a predetermined range of low weight indication by the weight indicating scale. The fortune indicator actuating means affixed to the weighing mechanism shaft rotates with this shaft in a counterclockwise direction, the roller 64 having a normal position adjacent the nose of the pawl lever 63 so that movement of the actuator will cause the roller to depress the pawl lever to release the ratchet wheel for clockwise rotation by the engagement of pawl 48 with the toothed periphery of the wheel as the actuator swings. Engagement of the roller with the nose of the pawl lever and the engagement of the ratchet wheel driving pawl occurs only in the early swinging movement of the actuator but this engagement obviously places a load on the weighing mechanism to interfere with its indication of an accurate weight during the period of actuation of the fortune indicating means. This load, however, occurs within predetermined limits for the individual mounting of the fortune indicating means, making it possible to free this mechanism from the weighing mechanism in a brief time after power is applied to the weighing platform. The scale actually clears itself for accurate weight indication above a predetermined weight value, which may be up to eighteen pounds. Therefore, the scale is designed to give accurate weight above the weight indicating range within which actuation of the fortune wheel takes place. After the fortune wheel is actuated, the fortune indicating mechanism has no effect whatsoever upon the accurate indication of the scale mechanism.

The operation of the device will be apparent from the foregoing description, but briefly stated it is as follows.

When a weight is applied to the scale platform, the pull of the rack bar 21 causes the weighing mechanism shaft to be rotated in counterclockwise direction as viewed in Fig. 5, and this rotation carries with it the fortune wheel actuator to produce a clockwise movement of the fortune wheel shaft which will vary somewhat, dependent on the manner in which the weight is applied to the weighing platform. The weight and fortune indication is made visible to a person being weighed by the insertion of a coin in one of the slots at the head of the machine, so that the coin travels downwardly into the cup causing the shutter to swing on its pivot to uncover the weight and fortune indicating windows. When the weight is removed from the platform, the weighing mechanism is returned to its original zero position by the spring support, in which movement the disk wheel trips the coin cup, delivering the coin into the chute 13 to be conducted into the machine or to the return cup for extraction by a user.

From the detailed description of the invention, it will be noted that there is provided a combined weighing scale and amusement device wherein the amusement device is actuated by the mechanism without interference with the indication of the true weight by said mechanism above a certain weight value. The device avoids the necessity of manual actuation and provides a structure which will not easily get out of order. The invention has been described in connection with a fortune wheel. It will be obvious to those skilled in the art that other than printed fortunes can be displayed by the wheel mechanism.

The invention having been described in connection with the preferred embodiment, it is to be understood that the words which have been used are words of description rather than of limitation, and that the practice of the invention within the scope of the appended claims may be resorted to without departing from the true scope and spirit of the invention in all its aspects.

We claim:

1. In a display mechanism of the character described, a rotatable drive shaft, means for rotating said shaft, a rotatable display mechanism normally disconnected from the drive shaft, said independent mechanism including a rotatable shaft and indicator wheel having a series of individual printed areas around the outer surface of the wheel, means for holding the display mechanism against rotation to display one of the individual printed areas at a given point, and means operable with the drive shaft for releasing said holding means and for rotating said display mechanism during the initial movement of the drive shaft operation, said last mentioned means becoming disengaged from the display mechanism on predetermined movement of the drive shaft.

2. In a display mechanism of the character described, a drive shaft, means for rotating said shaft, an independent rotatable display mechanism normally disconnected from the drive shaft, means for holding the display mechanism against rotation to display one of the individual printed areas at a given point, and means operable with the drive shaft for releasing said holding means and for rotating said display mechanism during the initial movement of the drive shaft operation, said last mentioned means becoming disengaged from the display mechanism on predetermined movement of the drive shaft.

3. In a display device of the character described, a casing, a cover for said casing having a sight aperture therein, a rotatable drive shaft, a rotatable fortune display mechanism including a rotatable shaft and fortune wheel having a series of individual printed fortunes on the outer surface of the wheel viewable through the sight aperture, means for holding the fortune wheel against rotation to register one of said printed fortunes with said sight aperture, and means rotatable with the shaft for releasing said last mentioned means and for rotating said fortune wheel only in the initial movement of the drive shaft.

4. In a device of the character described, an upright casing, a cover for the casing with a sight aperture therein, a rotatable drive shaft in the casing, means for rotating said shaft, fortune indicating means including a rotatable fortune wheel having a series of individual printed fortunes on its outer surface readable through the sight aperture, means for locking the fortune wheel against rotation with a printed fortune in registry with the sight opening, means for releasing said locking means and for rotating said fortune wheel, said means including an adjustable swinging actuator fixed to the shaft for momentary engagement with said locking means and fortune indicating means in the initial movement of the drive shaft.

5. In a display mechanism of the character described, a rotatable drive shaft, means for rotating said shaft, a rotatable display mechanism normally disconnected from the drive shaft, said independent mechanism including a rotatable shaft and indicator wheel and a double ratchet wheel with teeth facing in opposite direction, means for locking said ratchet wheel against rotation in either direction, a balanced actuator including a plurality of adjustable plates fixed to said drive shaft in position to engage the ratchet wheel and a portion of said locking means in a swinging movement when the drive shaft is rotated to release the locking means and rotate the indicator wheel during the initial movement of the drive shaft, said actuator becoming disengaged from the display mechanism on predetermined movement of the drive shaft.

WM. P. DILLON, Jr.
FRANCIS V. ALLEN.